US006731313B1

(12) United States Patent
Kaminkow

(10) Patent No.: US 6,731,313 B1
(45) Date of Patent: May 4, 2004

(54) GAMING DEVICE HAVING TOUCH ACTIVATED ALTERNATING OR CHANGING SYMBOL

(75) Inventor: Joseph E. Kaminkow, Reno, NV (US)

(73) Assignee: IGT, Reno, NV (US)

(*) Notice: Subject to any disclaimer, the term of this patent is extended or adjusted under 35 U.S.C. 154(b) by 585 days.

(21) Appl. No.: 09/602,331

(22) Filed: Jun. 23, 2000

(51) Int. Cl.[7] .................................................. G06K 15/00
(52) U.S. Cl. ........................................ 345/839; 345/747
(58) Field of Search ................................ 345/839, 766, 345/767, 769, 802, 830, 831, 832, 773, 744–747, 702, 804, 805; 463/20, 16

(56) References Cited

U.S. PATENT DOCUMENTS 4,695,053 A 9/1987 Vazquez, Jr. et al.
5,342,047 A 8/1994 Heidel et al.
5,611,535 A 3/1997 Tiberio
5,766,074 A 6/1998 Cannon et al.
5,769,716 A 6/1998 Saffari et al.
5,823,873 A 10/1998 Moody
5,951,397 A 9/1999 Dickinson
5,980,384 A * 11/1999 Barrie ........................ 463/16
5,997,401 A 12/1999 Crawford
6,027,115 A 2/2000 Griswold et al.
6,056,642 A 5/2000 Bennett
6,142,875 A 11/2000 Kodachi et al.
6,159,096 A * 12/2000 Yoseloff ...................... 463/20
6,227,971 B1 * 5/2001 Weiss .......................... 463/20
6,290,600 B1 * 9/2001 Glasson ........................ 463/20
6,302,790 B1 * 10/2001 Brossard ...................... 463/20
6,375,568 B1 * 4/2002 Roffman et al. .............. 463/16
6,533,658 B1 * 3/2003 Walker et al. ................ 463/13
2002/0039919 A1 4/2002 Joshi et al.

FOREIGN PATENT DOCUMENTS

EP 0945837 A2 9/1999
WO WO 97/32285 9/1997

OTHER PUBLICATIONS

Cash Chameleon Brochure published by Aristocrat.
Description of Animating Symbol Feature in Gaming Machines.
Banana–Rama Brochure published by Silicon Gaming.
Break the Spell Brochure published by Atronics in 1999.
Jazzy Jackpots Advertisements written by Atronic, published in 2000.
Jazzy Jackpots Article written by Strictly Slots, published in Mar. 2001.

* cited by examiner

*Primary Examiner*—Steven Sax
(74) *Attorney, Agent, or Firm*—Bell, Boyd & Lloyd LLC

(57) ABSTRACT

The present invention enables a player to choose or alter certain symbols displayed on the reels of the gaming device. The player can change or select the changeable symbol at any time as long as the reels are not in motion. The gaming device maintains the change until the player changes the symbol again. The gaming device preferably supplies a touch screen along with a video monitor in which the reels and associated stops are simulated. The touch screen enables the player to simply touch the symbol that the player wishes to change. Pressing a single symbol may change the selected symbol or others linked to the symbol. A stop on the reels having a selectable symbol can provide the player with any number of possible symbols from which to choose. The changeable symbols preferably have a direct effect upon whether the player obtains a gaming device award.

23 Claims, 7 Drawing Sheets

GAMING DEVICE HAVING TOUCH ACTIVATED ALTERNATING OR CHANGING SYMBOL

CROSS-REFERENCE TO RELATED APPLICATIONS

This application is related to the following commonly-owned co-pending patent applications: "GAMING DEVICE WITH TRAVELING REEL SYMBOLS," Ser. No. 09/606,928, "GAMING DEVICE WITH TRAVELING REEL SYMBOLS," Ser. No. 09/689,197, "GAMING DEVICE WITH MULTI-PURPOSE REELS," Ser. No. 09/606,733, "GAMING DEVICE WITH MOVING SCREEN SIMULATION," Ser. No. 09/625,884, "GAMING DEVICE WITH SIGNIFIED SYMBOLS," Ser. No. 09/605,344, "GAMING DEVICE PROVIDING TOUCH ACTIVATED SYMBOL INFORMATION," Ser. No. 09/680,349, "GAMING DEVICE HAVING A CHANGEABLE OBJECT," Ser. No. 09/680,111, "GAMING DEVICE HAVING INTERACTING SYMBOLS," Ser. No. 09/686,308, "GAMING DEVICE HAVING CHANGED OR GENERATED PLAYER STIMULI," Ser. No. 09/686,244, "GAMING DEVICE HAVING A SYMBOL COVERING FEATURE," Ser. No. 09/684,275, "GAMING DEVICE HAVING A CASH OUT MENU SCREEN AND A SYSTEM AND METHOD FOR ENABLING A PLAYER TO RETRIEVE MONEY FROM A GAMING DEVICE," Ser. No. 09/687,690, "GAMING DEVICE WITH A BONUS SCHEME HAVING REPEATED SELECTION OF VALUE SETS WITH OPTION TO SAVE VALUES," Ser. No. 09/684,533, and "GAMING DEVICE HAVING INDEPENDENT REEL COLUMNS," Ser. No. 09/688,428.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device that enables a player to change or alter certain symbols displayed on the reels of the gaming device, which form random combinations of symbols that may yield an award.

BACKGROUND OF THE INVENTION

Gaming device manufactures have long provided gaming machines employing a plurality of reels, wherein the reels each have a plurality of symbols. In the 1930's, gaming device manufacturers provided a three reel gaming device, wherein each reel had ten stops, which produced a thousand combinations. One way for the manufacturers to increase the number of combinations was to increase the size of the reel and to add more stops. During the next four decades, the reels in the gaming devices increased to twenty stops. In the 1970's, manufacturers developed a twenty-two stop reel machine, in the early 80's a twenty-five stop reel machine, and in 1985, IGT, the assignee of the present invention, developed a thirty-two stop reel machine. This three-reel machine had 32,768 possible combinations.

Another way manufacturers increased the number of combinations was to add reels. In 1955, a manufacturer produced a four-reel slot machine, which increased the number of combinations on a twenty stop machine to 160,000. In the middle 1970's, a manufacturer produced the first five-reel slot machine, which had twenty-two stop reels and produced combinations in excess of five million.

The next advancement in the effort to produce more payout combinations was the video or CRT screen slot machine, wherein the reels were simulated as opposed to mechanical. Video slot machines do not have mechanical drums or reels which rotate, do not need to precisely stop the same at certain positions and are therefore not limited by a maximum allowable drum radius. Each reel can have an unlimited number of stops. Initially, the Nevada gaming Commission limited the stops on the video machines (e.g., 84 stops on a three reel machine) but has since removed the limit. In 1989, a particular video reel machine employed reels having hundreds of stops and more than 10 million combinations.

The total number of combinations affects the percentage of time hat a player will obtain a particular winning combination as well as the overall payout percentage of the machine. For example, a three reel machine having twenty-two stops per reel, wherein the first reel has two oranges, the second reel has three oranges, and the third reel has seven oranges will yield an orange, orange and orange combination 42 times in every 10,648 plays (22×22×22) or 0.39% of the time. If the orange, orange, orange combination pays 20 coins, then the total coins paid is 20×42 or 840 coins in every 10,648 plays. Adding the total coins paid for each winning combination and dividing that number by 10,648 yields the machine's total payout percentage.

It should be appreciated that in the known gaming systems, the percentage of obtaining a winning combination is predetermined. In certain known progressive gaming machines, the payout of a grand prize grows each time a player plays the machine. The increasing payout increases the total coins paid as determined above, which in turn increases the overall payout percentage. Nevertheless, the percentage of times that a player will receive one of the combinations remains constant.

To increase player enjoyment and excitement, it is desirable to provide players with new types of gaming devices that attract the player and keep the player entertained. One way to hold a player's interest is to vest the player with the ability to affect the determination of the outcome. That is, to give the player a stake or "say so" in the manner in which the gaming device determines the player's outcome. Certain known gaming devices have bonus rounds, wherein a player selects the player's own fate. For example, European Patent Application No. EP 0 945 837 A2 filed on Mar. 18, 1999 and assigned on its face to WMS Gaming, Inc. discloses a gaming device having a bonus round, wherein a player chooses a masked symbol from a pattern of symbols, and the gaming device removes the mask and either awards the player with a bonus value or terminates the bonus round with a bonus terminator. The player chooses until selecting a bonus terminator. However, known gaming devices have yet to add similar player selectivity to the base game or reel operation of the gaming device.

SUMMARY OF THE INVENTION

The present invention overcomes the above shortcomings by enabling the player to choose or alter certain symbols displayed on the reels of the gaming device. The reels of a gaming machine, even in video form, each contain a set number of stops. Of those stops, the present invention designates or assigns certain stops to have changeable symbols. In a multiple reel gaming device, each reel may or may not have one or more changeable symbols.

The present invention enables the player to change or select the changeable symbol at any time as long as the reels are not in motion. The present invention contemplates letting a potential player who has yet to place money in the gaming device toggle through and peruse the various selections that the player can make. While playing the device, the player can select or change a changeable symbol at any time, and the gaming device maintains the change until the player (or another player) changes the symbol again.

The present invention preferably provides a touch screen video monitor in which the reels and associated stops are simulated. The touch screen enables the player to simply touch the symbol that the player wishes to change. Alternatively, the gaming device can provide a bare video monitor or television screen that merely displays the symbols. In this embodiment, the gaming device provides extra input devices such as push-buttons that enable the player to toggle though the selection of changeable symbols.

The gaming device contemplates the act of pressing a single changeable symbol or pushbutton having a plurality of effects. One effect that the act of pressing a symbol or button has is to change the selected symbol and nothing more. In this embodiment, each changeable symbol is individually selectable. In other embodiments, one or more changeable symbols are linked. For example, in one embodiment, changing a symbol changes all like symbols on the same reel. In another embodiment, changing a symbol changes all like symbols on the same payline. In a further embodiment, changing a symbol changes all like symbols displayed on the video monitor. In a still further embodiment, changing a symbol changes all like symbols on every one of the stops of the gaming device.

A stop having changeable symbols may have two or more possibilities. That is, a person may toggle through and select from two, three, four, or any number of possible symbols that the implementor wishes to provide. Different stops can have different symbols and a different number of symbols from which to choose. Preferably, the choices follow a theme that the gaming device employs. For example, one embodiment of the present invention contains symbols relating to oriental food dishes and drinks. The gaming device enables the player to toggle or change between a "MSG" symbol or a "NO MSG" symbol. The player can therefore select which symbol with which the player desires to play the game.

The present invention preferably provides an audio display or production that coincides with the change or selection of a new symbol. The production can prompt the player, e.g., "Would you like "MSG" or "NO MSG?". Alternatively, the production can acknowledge a player's choice e.g., "MSG, NO MSG, You have selected NO MSG." A separate video display or screen on the video monitor can enhance or increase enjoyment through a suitable demonstration that corresponds to a symbol change.

At least one and preferably a greater percentage of the winning combinations of symbols maintained by the gaming device contain at least one changeable or selectable symbol. In this way, changing the symbol has a direct affect upon whether the player succeeds and wins an award. The changeable symbols also enable the player to establish personal preferences on the symbols, which vest the player in the outcome of the gaming device and provide additional enjoyment and entertainment for the player.

It is therefore an object of the present invention to provide a gaming device that enables a player to change one or more symbols on a random outcome generating reel of a gaming device.

Another object of the present invention is to enable the player to make selections that directly affect the outcome of playing the gaming device.

Yet another object of the present invention is to vest the player in the gaming device by enabling said player to establish personal preferences through the selection of changeable symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
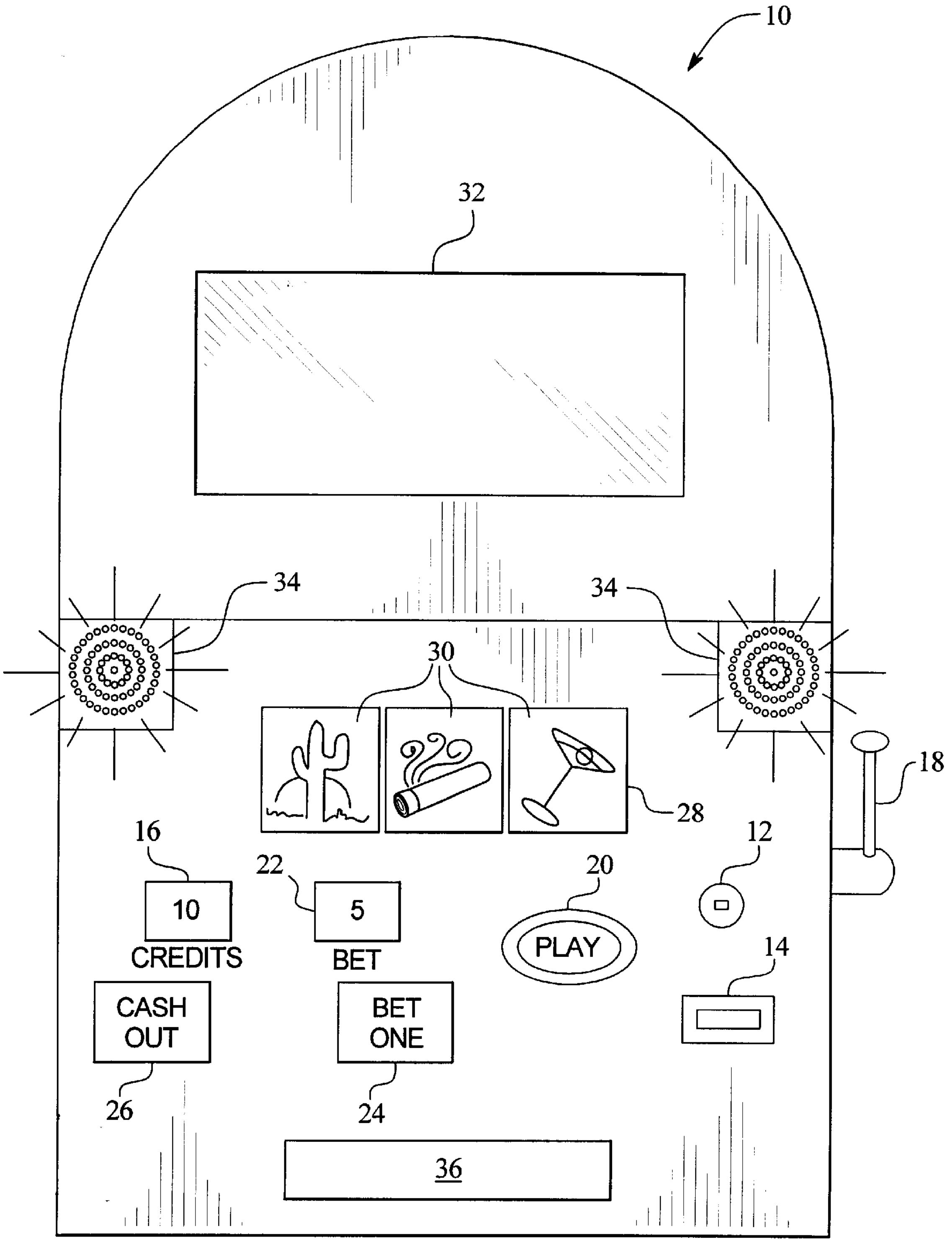
FIG. 1 is a front plan view of the general configuration of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) that a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can incorporate any game such as slot, poker or keno. The symbols used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of symbols such as bells, hearts, martinis, fruits, cactuses, numbers, cigars, letters, bars or other images which preferably correspond to a theme associated with the gaming device 10. If the reels 30 are in video form, the gaming device 10 preferably displays the video reels 30 at video monitor 32 instead of at display window 28. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
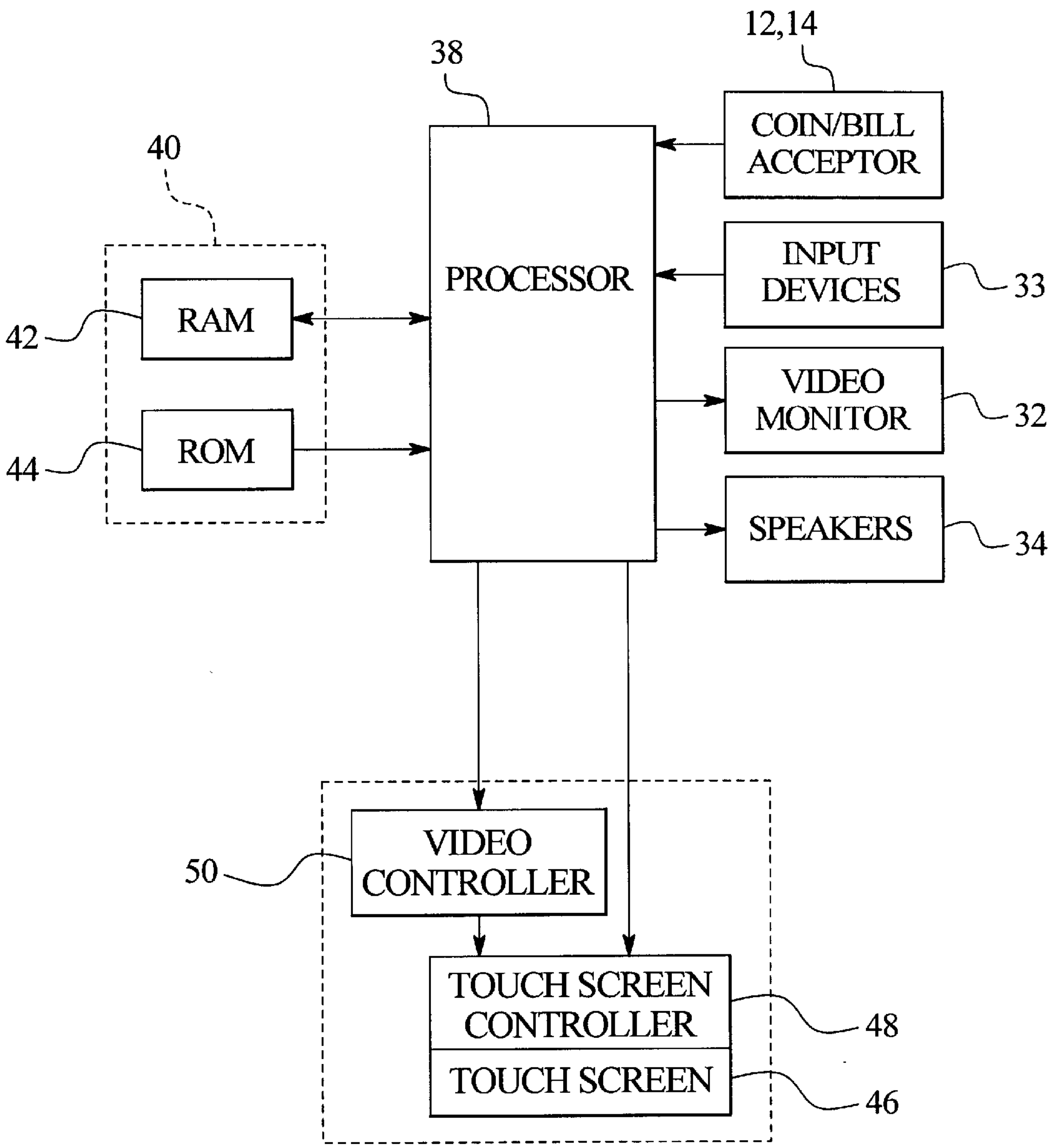
FIG. 2 is a schematic block diagram of the electronic configuration of one embodiment of the gaming device of the present invention.

With respect to electronics, the controller of gaming device 10 preferably includes the electronic configuration generally illustrated in FIG. 2, which has: a processor 38; a memory device 40 for storing program code or other data; a video monitor 32 or other display device (i.e., a liquid crystal display); a plurality of speakers 34; and at least one input device as indicated by block 33. The processor 38 is preferably a microprocessor or microcontroller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses the input devices 33, such as the arm 18, play button 20, the bet one button 24 and the cash out button 26 to input signals into gaming device 10. Furthermore, it is preferable that touch screen 46 and an associated touch screen controller 48 are used instead of a conventional video monitor 32. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

Gaming Device Apparatus

Figure 3:
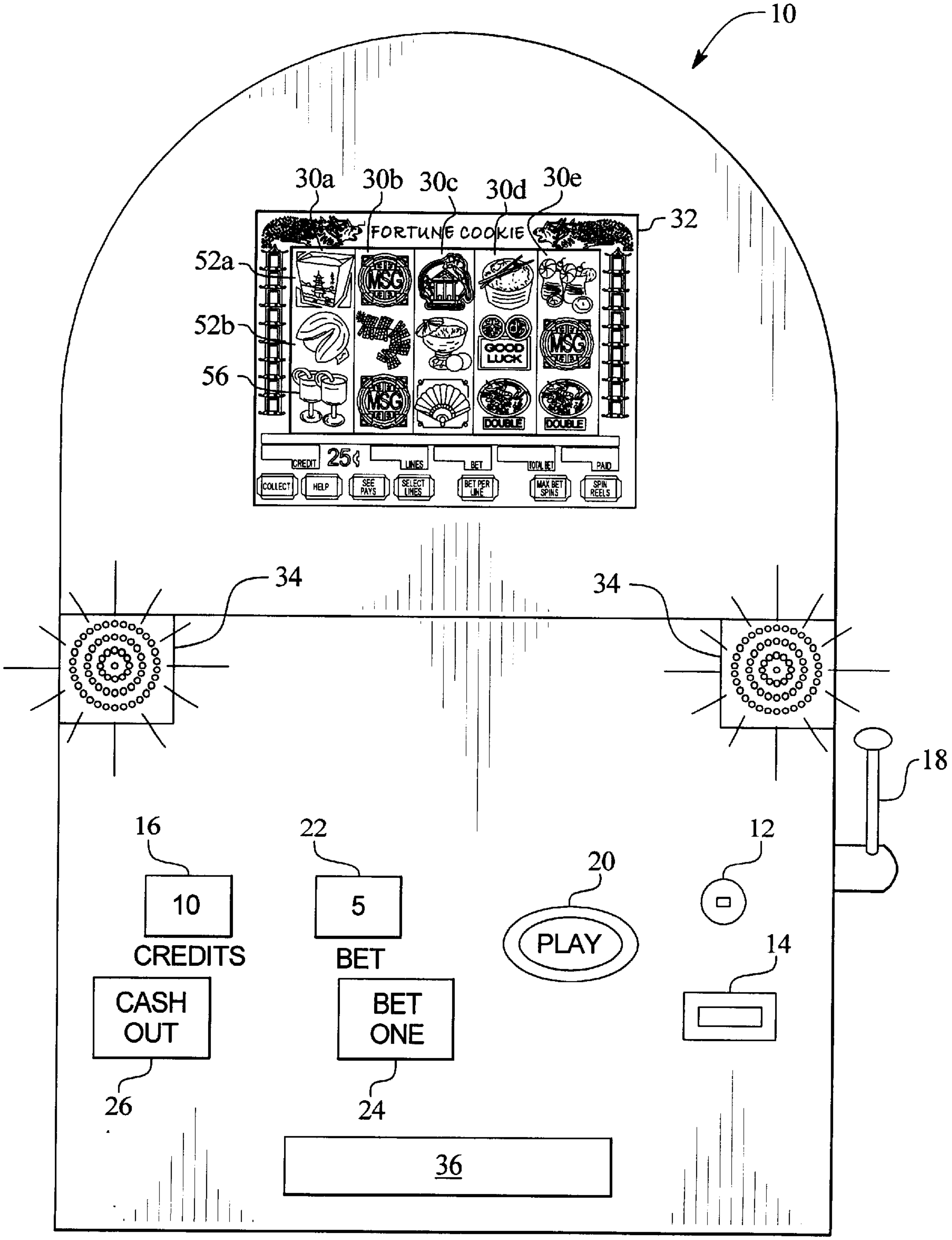
FIG. 3 is a front plan view of one embodiment of the gaming device of the present invention that illustrates a touch screen video monitor with a plurality of selectable or changeable reel stops.

Referring to FIG. 3, the present invention preferably employs a video monitor 32 having a touch screen 46 and touch screen controller 48 (shown in FIG. 2). Therefore, FIG. 3 does not display the display window 28 described with respect to FIG. 1. Accordingly, the video reels 30 are displayed in the video monitor 32. The embodiment displayed in FIG. 3 has five reels 30*a*, 30*b*, 30*c*, 30*d*, and 30*e*. The present invention contemplates providing any number of reels, preferably, the present invention provides three to five reels.

The embodiment displayed in FIG. 3 also has three paylines 52*a*, 52*b*, and 52*c*. This embodiment shows a known type of gaming machine called a "line machine" which has multiple paylines which display a plurality of rows of symbols from the reels 30 as illustrated in FIG. 3. The line machines are distinguishable from the gaming machine displayed in FIG. 1 that has only one row of symbols or one payline. The multiple rows present multiple opportunities for the player to obtain a winning combination of symbols. Usually, players have to bet or pay more to obtain the benefit of the multiple lines. For illustration purposes, the present invention is described in connection with a line machine, however, the present invention contemplates employing single payline machines such as shown in FIG. 1.

Figure 4:
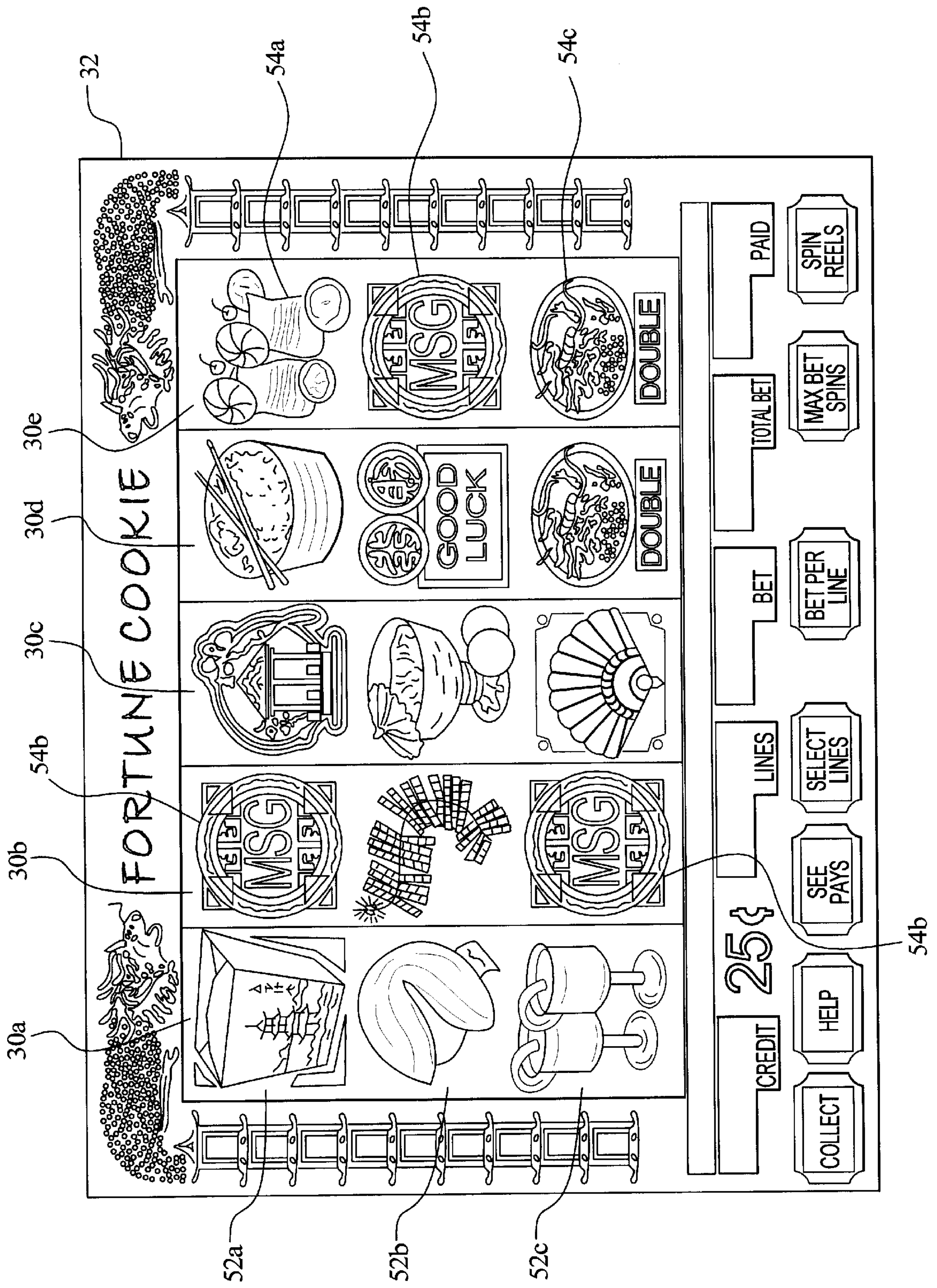
FIG. 4 is front plan view of one embodiment of the display of the video monitor of the gaming device having selectable or changeable reel stops.

Referring now to FIG. 4, an enlarged video screen 32 having a touch screen 46 and a touch screen controller 48 (shown in FIG. 2) displays the reels 30*a* through 30*e* and the paylines 52*a* through 52*c* described above. Each reel displays a plurality of symbols 54. For example, reel 30*e* displays the symbols 54*a*, 54*b* and 54*c*. The present invention contemplates enabling the player to change one or more of the symbols 54. Preferably, the present invention enables the player to change like symbols regardless of the reel on which they appear. For example, in one embodiment the present invention enables the player to change the "MSG" symbol 54*b* on reel 30*e*. The player can likewise change the "MSG" symbols 54*b* on the reel 30*b*.

In this embodiment, the present invention only enables the player to change the "MSG" symbol 54*b*, and its counterpart described below. However, the present invention contemplates enabling the player to change a plurality of symbols. For example, the present invention contemplates enabling the player to change the "DOUBLE DRAGON" symbol 54*c* as well as the "MSG" symbol. The implementor of the gaming device can enable a player to change any number of symbols in accordance with the gaming device theme and the payout structure of the gaming device.

Figure 5:
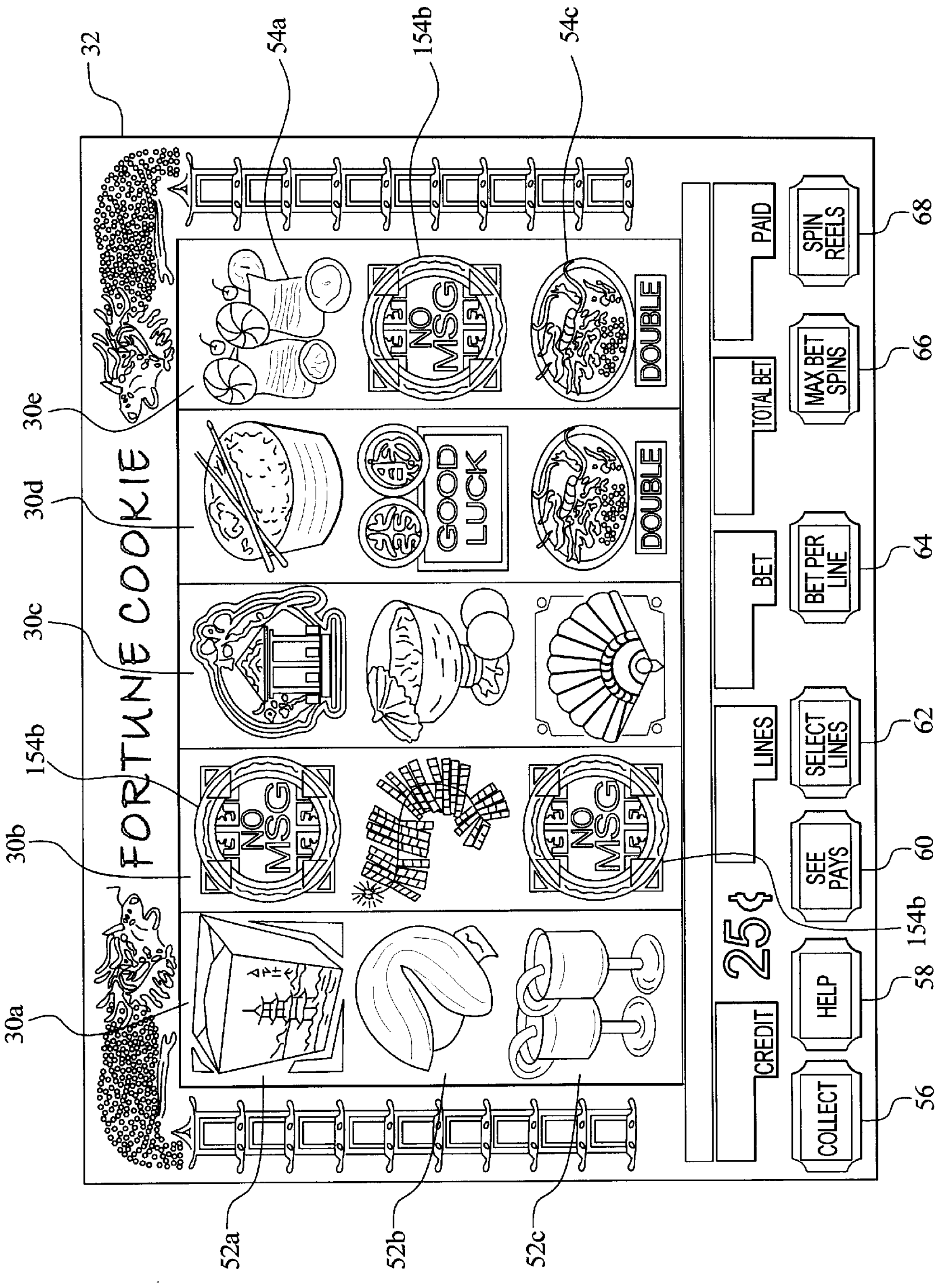
FIG. 5 is a front plan view of another embodiment of the display of the video monitor of the gaming device having selectable or changeable reel stops.

Referring now to FIG. 5, the same enlarged video screen 32 as in FIG. 4 is shown displaying the changed symbol 154*b*. The symbol 154*b* displays the text "NO MSG." The preferred embodiment of the present invention contains a theme, wherein the game displays oriental items including oriental food and gives the player a choice between having "MSG" or "NO MSG." The theme distinguishes the choices that are provided. It should be appreciated that the present invention does not have to provide a theme. The choices can be completely unrelated to each other. For example, the counterpart to the "MSG" symbol 54*b* can be the "DOUBLE DRAGON" symbol 54*c*.

In accordance with the theme of the gaming device, the present invention preferably provides an audio display that accompanies the player's decision to change one of the symbols 54. For example, in the preferred embodiment, the gaming device emits a voice having the characteristics of an oriental man from the speakers 34 when the player changes the "MSG" symbol 54*b* or the "NO MSG" symbol 154*b*. When the player changes the "MSG" symbol, the speakers emit the voice of an oriental man saying the letters, "M-S-G." Likewise, when the player changes the "NO-MSG" symbol 154*b*, the speakers emit the voice saying, "NO-MSG." This provides the player with an entertaining aside from playing the game.

It should be appreciated that the gaming device can provide an audio display before and after the player changes a symbol. For example, the gaming device can, after every spin of the reels, prompt the player with a suitable message such as, "MSG or NO-MSG?". The present invention can provide any suitable sound and is not limited to reciting the text of the symbol.

The invention also contemplates providing a visual display either before, after or contemporaneous with a symbol change. The video display 32 or some other suitable display can produce the visual display, which preferably corresponds with the theme of the gaming device. For example, the present invention can have a separate display of a fictitious blood pressure indicator that fluctuates depending upon whether the player selects "MSG" or "NO-MSG."

Referring now to FIGS. 4 and 5, the present invention preferably includes a touch screen 46 with the video display 32. The touch screen 46 of the video display 32 enables the player to command the game to perform many functions. The collect button 56 enables the player to cash out. The help button 58 enables the player to receive instructions. The "see pays" button 60 enables the player obtain payout information. The "select lines" button 62 enables the player to activate different paylines 52. The "bet per line" button 64 enables the player to modify the player's bet for each payline 52. The "max bet spin" button 66 enables the player to bet the maximum amount and immediately initiate the spin of the reels. The "spin reels" button 68 enables the player to initiate the spin of the reels.

The touch screen 46 of the video display 32 also enables the player to change the symbols 54*b* and 154*b*. Preferably, when the game displays the "MSG" symbol 54*b*, and the player desires the "NO MSG" symbol, the game enables the player to touch the area of the display 32 that contains the symbol 54*b*. The gaming device switches the symbol and provides the associated or accompanying audio and video displays. Likewise, if the player desires to have MSG, the player selects the displayed "NO-MSG" symbol 154*b*, and the gaming device switches the symbol to the "MSG" symbol.

It should be appreciated that the present invention can operate wherein the video monitor 32 does not contain a touch screen 50. This embodiment requires an extra input device 33 (FIG. 2) similar in form and operation to the cash out button 26 or bet one button 24 described in connection with FIG. 1. The input device toggles though the selections and the video monitor displays the various symbols as they are toggled. The separate input embodiment can toggle through any number of symbols 54, however, it should be appreciated that each selection group or pair (e.g., "MSG"/"NO-MSG") requires its own toggling input. For example, the gaming device can enable the player to toggle both "MSG" or "NO-MSG" and "DOUBLE DRAGON" or "SINGLE DRAGON." In this instance, the gaming device supplies two separate toggle switches.

Referring back to FIG. 4, the invention contemplates a symbol change affecting the symbol 54 selected, all like symbols in a reel 30, all like symbols in a payline 52, all like symbols in the video monitor 32, or all like symbols maintained by the gaming device. For example, in one embodiment, when the player selects the "MSG" symbol 54*b* on reel 30*e*, intending to change it to the "NO MSG" symbol 154*b*, the gaming device only changes that symbol. That is, the other "MSG" symbols 54*b* displayed on reel 30*b* are not effected and remain unchanged.

Referring still to FIG. 4, in another embodiment of the present invention, when the player selects either of the "MSG" symbols 54*b* displayed on reel 30*b*, intending to change it to the "NO MSG" symbol 154*b*, the gaming device changes all the "MSG" symbols on that reel. That is, both the "MSG" symbols 54*b* displayed in paylines 52*a* and 52*c* of reel 30*b* are changed regardless of which "MSG" symbol the player selects. The "MSG" symbol 54*b* on reel 30*c*, however, remains unchanged. The present invention can change all the "MSG" symbols 54*b* on the entire reel 30*b*, shown in FIG. 7, or, alternatively, can change only the "MSG" symbols 54*b* displayed in video monitor 32, i.e., the two shown in paylines 52*a* and 52*b*.

Figure 6:
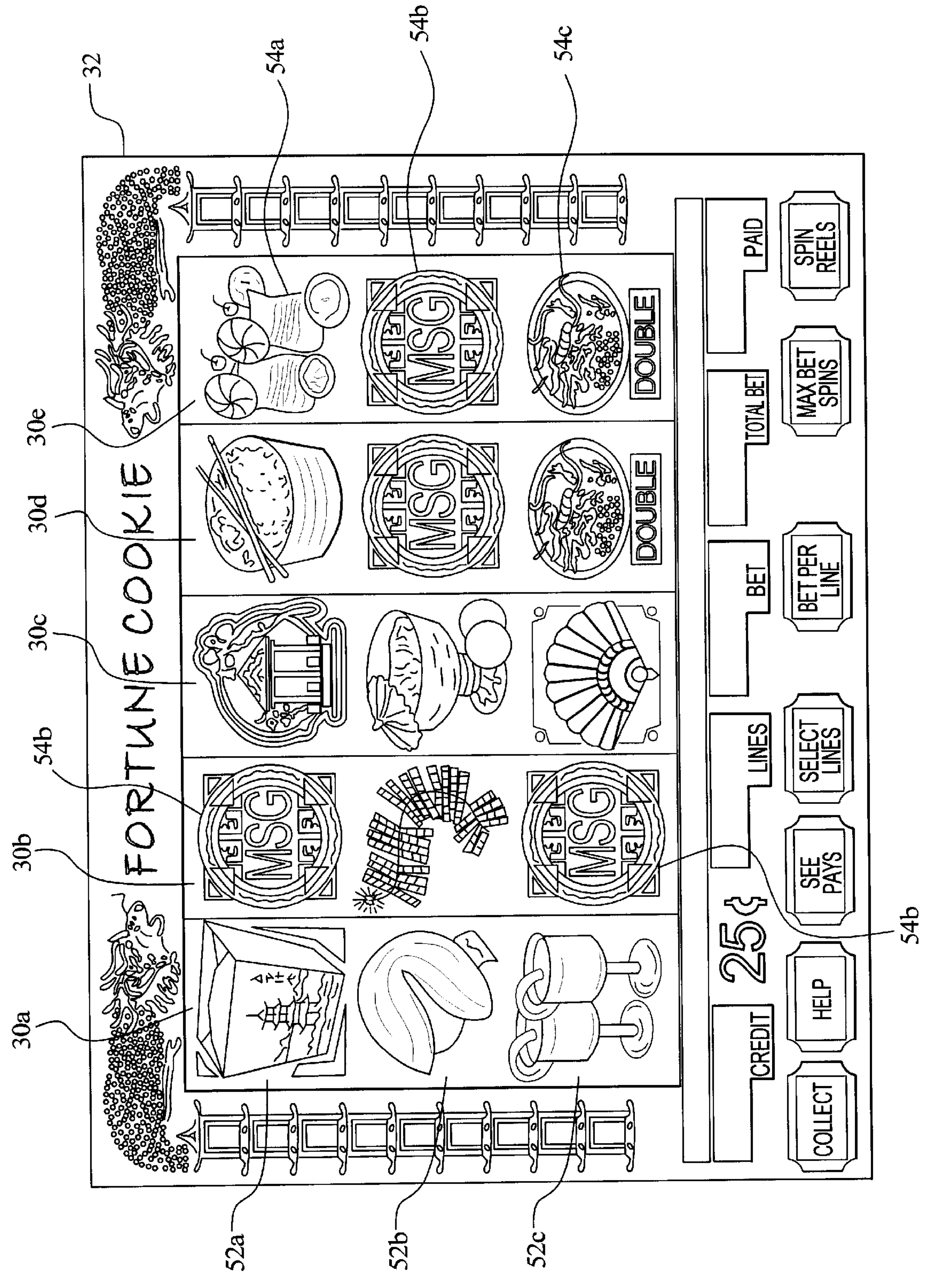
FIG. 6 is a front plan view of a further embodiment of the display of the video monitor of the gaming device having selectable or changeable reel stops.

Referring to FIG. 6, in a further embodiment of the present invention, when the player selects either of the "MSG" symbols 54*b* displayed in payline 52*b*, intending to change it to the "NO MSG" symbol 54*d*, the gaming device changes all the "MSG" symbols in that payline. That is, both the "MSG" symbols 54*b* displayed in reels 30*d* and 30*e* of the payline 52*b* are changed regardless of which "MSG" symbol the player selects. The "MSG" symbols 54*b* on paylines 52*a* and 52*c*, however, remain unchanged.

Referring again to FIG. 4, in a still further embodiment of the present invention, when the player selects any of the "MSG" symbols 54*b* displayed in the video monitor 32, intending to change it to the "NO MSG"symbol 154*b*, the gaming device changes all the "MSG" symbols displayed in the video monitor. That is, all three of the "MSG" symbols 54*b* displayed in reels 30*b* and 30*e* are changed regardless of which "MSG" symbol the player selects. The present invention can change all the "MSG" symbols 54*b* on every stop of the gaming machine, shown in FIG. 7, or, alternatively, can change only the "MSG" symbols 54*b* displayed in video monitor 32, i.e., the three shown in the reels 30*b* and 30*c*.

In the above embodiments wherein the gaming device links the symbols 54*b* or 154*b* (i.e., the linked payline embodiment, the linked reel embodiment, the linked video screen embodiment, and the linked all stops embodiment), the linked changeable symbols can be in-sink such that they all display the "MSG" symbol 54_b_ or the "NO MSG" symbol 154_b_ at all times. This embodiment is preferred when there are more than two possibilities to choose from for a particular stop that contains a changeable symbol. Alternatively, the present invention can link the changeable symbols so that they all change at one time, but wherein each linked symbol can change to either the "MSG" symbol or the "NO-MSG" symbol.

As briefly described above, the gaming device can enable a player to change any number of symbols in accordance with the gaming device theme and its payout structure. In the examples given above, the present invention contemplates enabling the player to change the "DOUBLE DRAGON" symbol 54_c_, or other suitable symbol, as well as the "MSG" symbol 54_b_ and the "NO MSG" symbol 54_b_. In essence, the present invention contains a set of changeable symbols, and the gaming device can assign any symbols of the set to any pay stop on the reels having changeable symbols.

Figure 7:
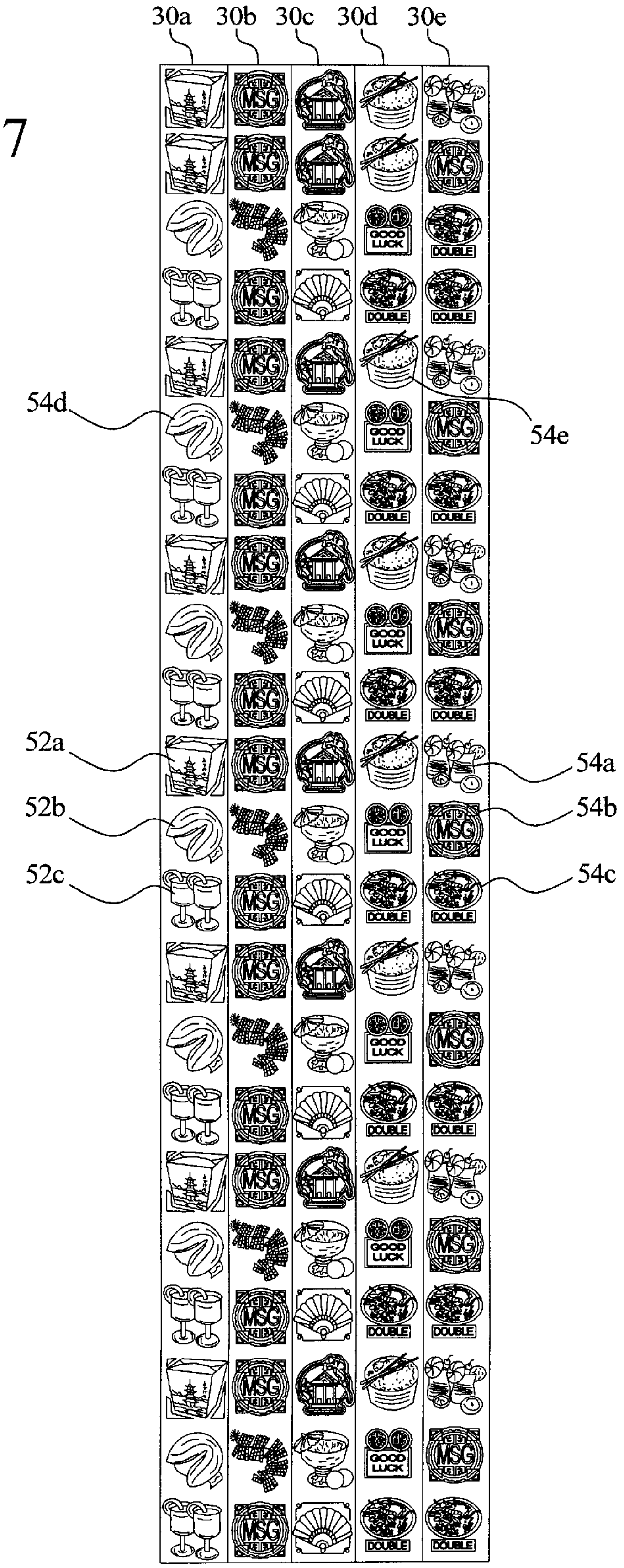
FIG. 7 is a top plan view of five reel strips having a plurality of stops which contain changeable symbols.

Referring to FIG. 7, to illustrate the multiple selection embodiment, the entire twenty-two stop and five reel array of symbols is displayed. The array contains 110 total stops. Each stop could wind up in one of the three paylines 52_a_, 52_b_ or 52_c_ after the player spins the reels. Each stop is either changeable or not changeable. In the preferred embodiment, each stop having the "MSG" symbol 54_b_ is changeable and all others are fixed. In one embodiment, the set of possibilities for each changeable symbol includes the "MSG" symbol, which is displayed, or the "NO-MSG" symbol, which would be displayed if the player selected or pressed the area of the touch screen containing the "MSG" symbol 54_b_.

Alternatively, the present invention can also make the "DOUBLE DRAGON" symbol 54_c_ and the "FORTUNE COOKIE" symbol 54_d_ changeable, so that the set of changeable symbol includes four possibilities. The present invention can include any number of symbols in the set. It should be appreciated that the changeable symbols could have any indicia and are not limited to the indicia discussed in these examples. The indicia discussed in the examples merely aid in illustrating the present invention. With that understood, the present invention contemplates distributing the symbols or possibilities in a plurality of ways.

In one embodiment, the changeable symbols operate in pairs. For example, the player can toggle back and forth between the "MSG" symbol 54_b_ and the "NO-MSG" symbol 154_b_ or between the "DOUBLE DRAGON" symbol 54_c_ and the "FORTUNE COOKIE" symbol 54_d_. The pairs preferably operate independently of each other, i.e., selecting "MSG" or "NO-MSG" has no effect upon the "DOUBLE DRAGON" or "FORTUNE COOKIE" symbols and vice-versa.

The pairs can alternatively operate dependently, i.e., selecting "MSG" or "NO-MSG" affects the "DOUBLE DRAGON"/"FORTUNE COOKIE" pair. In this alternative, the gaming device links the pairs so that when, for example the "MSG" symbol appears, the "DOUBLE DRAGON" symbol also appears. If the player selects either one, all "MSG" symbols change to "NO-MSG" symbols and all "DOUBLE DRAGON" symbols change to "FORTUNE COOKIE" symbols. Likewise, selecting either of the "NO-MSG" or "FORTUNE COOKIE" symbols changes these symbols to the "MSG" and "DOUBLE DRAGON" symbols, respectively. This example illustrates a changeable symbol pair linking to one other symbol pair. It should be appreciated that a changeable symbol pair can link to a plurality of different symbol pairs.

In another embodiment, any stop having a changeable symbol enables the player to toggle through all four of the selections. In a further embodiment, any stop having a changeable symbol enables the player to toggle through three of the four selections. It should be appreciated that the present invention contemplates any changeable stop having any number of the possibilities, the determination of which the implementor makes based on the gaming device theme and payout structure.

It is well known that gaming devices having a set of reels that display symbols contain combinations of symbols that yield awards or prizes to the player. The present invention contemplates having such combinations and having one or more symbols of those combinations be changeable symbols. The implementor determines the number of changeable symbols that comprise a winning combination based upon a game theme and upon the payout structure.

For example, the present invention contemplates issuing the player 10 credits for obtaining two "MSG" symbols 54_b_ or 15 credits for obtaining three "NO-MSG" symbols 154_b_. In this example, the player increases the percentage of obtaining a winning combination by setting all the symbols to display the "MSG" symbols 54_b_. The player plays for "bigger money" by setting all the symbols to display the "NO-MSG" symbol.

In the embodiment wherein the "DOUBLE DRAGON" symbol 54_c_ and the "FORTUNE COOKIE" symbol 54_d_ are also changeable, the present invention contemplates awarding the player credits for obtaining one of each, i.e. for obtaining an "MSG" symbol, a "NO-MSG" symbol, a "DOUBLE DRAGON" symbol, and a "FORTUNE COOKIE" symbol. In this example, the player maximizes the chances of obtaining this winning combination by setting the changeable stops to have an equal amount of each of the above mentioned symbols.

These examples illustrate that the present invention enables the player to affect the likelihood of obtaining a particular winning combination. The gaming device enables the player to establish personal preferences such as MSG or NO MSG, caffeine or no caffeine, favorite player X or favorite player Y etc., wherein the preferences directly affect the player's success at playing the gaming device. In certain instances, such as changing a symbol to display the logo of a favorite sports team or the name of the player's hometown or city, the selection may vest the player in the outcome of the game. That is, the player desires to win a gaming device award, and the player desires to win the award with the symbols displaying the player's favorite team or city.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

a wagering game including a plurality of reels having a plurality of symbols;

at least one winning combination of said symbols on said reels;

at least one changeable symbol on one of said reels wherein said changeable symbol is player selectable and changeable between at least two different symbols at the same position on the reel, and wherein said different symbols have the same function on the reels and in the game for determining any winning combination of symbols; and means for enabling a player to selectively change said changeable symbol on the reel, to each of the different symbols, wherein the two different symbols are located at the same position on said reel, wherein said changeable symbol is linked to another changeable symbol on the reels which is also changed when the changeable symbol is changed by the player.

2. The gaming device of claim 1, wherein the changing means includes a touch screen which enables a the player to change said changeable symbol by touching the touch screen.

3. The gaming device of claim 2, which further includes more than two changeable symbols on said reels.

4. The gaming device of claim 3, which includes at least one changeable symbol on each reel.

5. The gaming device of claim 3, which includes a plurality of changeable symbols on each reel.

6. The gaming device of claim 3, which includes a plurality of changeable symbols on at least of said reels.

7. The gaming device of claim 1, wherein the plurality of changeable symbols are on one of said reels.

8. The gaming device of claim 1, wherein said linked changeable symbols have the same different symbols representing said changeable symbols.

9. The gaming device of claim 1, wherein said linked changeable symbols are on different reels.

10. The gaming device of claim 1, which further includes a sound produced when said changeable symbol is changed.

11. A method for operating a gaming device, said method comprising the steps of:

displaying a plurality of symbols on a plurality of reels of a wagering game of said gaming device wherein at least one of said symbols is a changeable symbol which is changeable between at least two different symbols at the same position on said reel and wherein said two different symbols perform the same function on the reels and in the game for determining any winning combination of symbols;

enabling a player to change said changeable symbol on said reel; and changing said changeable symbol from one of the different symbols to another one of the different symbols at the same position on said reel when said player indicates that the player wants to change said changeable symbol, wherein said changeable symbol is linked to another changeable symbol on the reels which is also changed when the changeable symbol is changed by the player.

12. The method of claim 11, wherein the step of enabling the player to change said changeable symbol includes enabling the player to change a plurality of said changeable symbols.

13. The method of claim 12, wherein the step of enabling the player to change said changeable symbol includes providing a touch screen which enables the player to change said changeable symbol.

14. The method of claim 11, which includes displaying a plurality of changeable symbols on a plurality of reels of said gaming device, and enabling the player to change a plurality of said changeable symbols on said reels.

15. The method of claim 12, wherein said linked changeable symbols have the same different symbols representing said changeable symbols.

16. The method of claim 15, wherein said linked changeable symbols are on different reels.

17. A gaming device comprising:

a wagering game including a plurality of reels having a plurality of symbols;

a changeable symbol at a position on said reel, wherein said changeable symbol is changeable between at least two different of said symbols at said same position on said reel and wherein said different symbols each perform a same function on the reels and in the game for determining any winning combination of symbols;

a display device; and a processor operable with said display device to cause said changeable symbol to change between said different symbols on said reel, wherein each said different symbol is located at said same position on the reel as the other different symbol, wherein said changeable symbol is linked to another changeable symbol on the reels which is also changed when the changeable symbol is changed by the player.

18. The gaming device of claim 17, wherein the plurality of changeable symbols are on one of said reels, wherein each changeable is changeable between at least two different of said symbols at a position on the reel.

19. The gaming device of claim 17, which includes at least one changeable symbol on each reel, wherein each changeable symbol is changeable between at least two different of said symbols at a position on the reels.

20. The gaming device of claim 19, which includes a plurality of changeable symbols on each reel, wherein each changeable symbol is changeable between at least two different of said symbols at a position on the reels.

21. The gaming device of claim 17, wherein said processor is operable to change each symbol on at least one reel which is linked with said changeable symbol when said processor changes said changeable symbol.

22. The gaming device of claim 17, wherein said linked changeable symbols have the same image representing said changeable symbols.

23. The gaming device of claim 17, wherein said linked changeable symbols are on different reels.

* * * * *

UNITED STATES PATENT AND TRADEMARK OFFICE
CERTIFICATE OF CORRECTION

PATENT NO. : 6,731,313 B1
DATED : May 4, 2004
INVENTOR(S) : Kaminkow et al.

It is certified that error appears in the above-identified patent and that said Letters Patent is hereby corrected as shown below:

Title page,
Item [75], Inventors, change "Joseph E. Kaminkow, Reno, NV (US)" to
-- Joseph E. Kaminkow, Reno, NV (US)
Aaron T. Jones, Reno, NV (US) --.

Column 11,
Line 15, change "enables a the player" to -- enables the player --.
Line 25, change "on at least of said reels" to -- on said reels --.

Column 12,
Line 10, change "claim 12", wherein" to -- claim 11, wherein --.
Line 13, change "claim 15, wherein" to -- Claim 11, wherein --.

Signed and Sealed this

Twenty-seventh Day of September, 2005

JON W. DUDAS
*Director of the United States Patent and Trademark Office*